(12) United States Patent
Woodfield et al.

(10) Patent No.: US 12,104,239 B2
(45) Date of Patent: Oct. 1, 2024

(54) TITANIUM ALLOYS AND THEIR METHODS OF PRODUCTION

(71) Applicant: General Electric Company, Schenectady, NY (US)

(72) Inventors: Andrew Philip Woodfield, Cincinnati, OH (US); Thomas Froats Broderick, Cincinnati, OH (US); William Andrew Sharp, II, Cincinnati, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 18/451,414

(22) Filed: Aug. 17, 2023

(65) Prior Publication Data

US 2023/0392247 A1   Dec. 7, 2023

Related U.S. Application Data

(63) Continuation of application No. 15/309,642, filed as application No. PCT/US2015/030601 on May 13, 2015, now abandoned.
(Continued)

(51) Int. Cl.
*C22F 1/18* (2006.01)
*B21K 3/04* (2006.01)
(Continued)

(52) U.S. Cl.
CPC ............... *C22F 1/183* (2013.01); *B21K 3/04* (2013.01); *B22D 7/005* (2013.01); *C22C 14/00* (2013.01);
(Continued)

(58) Field of Classification Search
CPC ........... C22F 1/183; B21K 3/04; B22D 7/005; C22C 14/00; F01D 5/28; F05D 2300/174; Y02T 50/60
See application file for complete search history.

(56) References Cited

U.S. PATENT DOCUMENTS 2,641,540 A   6/1953   Mohling et al.
2,940,163 A   6/1960   Davies
(Continued)

FOREIGN PATENT DOCUMENTS

CN   101104898 A   1/2008
CN   101597703 A   12/2009
(Continued)

OTHER PUBLICATIONS

Baeslack III et al., Selection and Weldability of Conventional Titanium Alloys, 1993 ASM International, vol. 6, 1993, 507-523.
(Continued)

*Primary Examiner* — Adil A. Siddiqui
(74) *Attorney, Agent, or Firm* — Dority & Manning, P.A.

(57) ABSTRACT

A composition of matter is generally provided, in one embodiment, a titanium alloy comprising about 5 wt % to about 8 wt % aluminum; about 2.5 wt % to about 5.5 wt % vanadium; about 0.1 wt % to about 2 wt % of one or more elements selected from the group consisting of iron and molybdenum; about 0.01 wt % to about 0.2 wt % carbon; up to about 0.3 wt % oxygen; silicon and copper; and titanium. A turbine component is also generally provided, in one embodiment, that comprises an article made from a titanium alloy. Additionally, methods are also generally provided for making an alloy component having a beta transus temperature and a titanium silicide solvus temperature.

5 Claims, 5 Drawing Sheets

Related U.S. Application Data (60) Provisional application No. 61/993,346, filed on May 15, 2014.

(51) Int. Cl.
    *B22D 7/00*     (2006.01)
    *C22C 14/00*     (2006.01)
    *F01D 5/28*     (2006.01)

(52) U.S. Cl.
    CPC .......... *F01D 5/28* (2013.01); *F05D 2300/174* (2013.01); *Y02T 50/60* (2013.01)

(56) References Cited

U.S. PATENT DOCUMENTS

| | | | |
|---|---|---|---|
| 2,968,586 | A | 1/1961 | Vordahl |
| 3,043,683 | A | 7/1962 | Hix |
| 3,069,259 | A | 12/1962 | Margolin et al. |
| 3,084,042 | A | 4/1963 | Wartel et al. |
| 3,765,954 | A | 10/1973 | Tokuda et al. |
| 3,813,227 | A | 5/1974 | Tomita |
| 5,118,363 | A | 6/1992 | Chakrabarti et al. |
| 5,314,106 | A | 5/1994 | Ambroziak et al. |
| 5,431,506 | A | 7/1995 | Masunaga |
| 5,564,492 | A | 10/1996 | Preiss |
| 5,792,289 | A | 8/1998 | Morton et al. |
| 5,961,792 | A | 10/1999 | Nelson et al. |
| 6,110,302 | A * | 8/2000 | Gorman ................ C22F 1/183 |
| | | | 148/407 |
| 6,190,465 | B1 | 2/2001 | Coutu et al. |
| 6,228,189 | B1 | 5/2001 | Oyama et al. |
| 6,488,238 | B1 | 12/2002 | Battisti |
| 6,726,784 | B2 | 4/2004 | Oyama et al. |
| 6,918,974 | B2 | 7/2005 | Woodfield |
| 7,195,455 | B2 | 3/2007 | Stonitsch et al. |
| 7,504,017 | B2 | 3/2009 | Cardarelli |
| 7,575,418 | B2 | 8/2009 | Gigliotti et al. |
| 7,601,232 | B2 | 10/2009 | Fonte et al. |
| 2001/0050117 | A1* | 12/2001 | Oyama ................ C22F 1/183 |
| | | | 148/421 |
| 2003/0211003 | A1 | 11/2003 | Kosaka et al. |
| 2004/0089380 | A1 | 5/2004 | Woodfield |
| 2004/0103751 | A1 | 6/2004 | Joseph et al. |
| 2007/0049418 | A1 | 3/2007 | Chern Lin et al. |
| 2008/0181808 | A1 | 7/2008 | Thamboo et al. |
| 2008/0190778 | A1 | 8/2008 | Withers et al. |
| 2008/0227566 | A1 | 9/2008 | Lin et al. |
| 2008/0264208 | A1 | 10/2008 | Jacobsen et al. |
| 2008/0304975 | A1 | 12/2008 | Clark et al. |
| 2010/0263373 | A1 | 10/2010 | Decker et al. |
| 2010/0320089 | A1 | 12/2010 | Misra et al. |
| 2012/0060981 | A1 | 3/2012 | Forbes Jones et al. |
| 2013/0164168 | A1 | 6/2013 | Tetyukhin et al. |
| 2014/0044584 | A1 | 2/2014 | Kanou et al. |
| 2014/0076468 | A1* | 3/2014 | Marquardt ............ C22C 14/00 |
| | | | 148/407 |
| 2014/0261922 | A1 | 9/2014 | Thomas et al. |
| 2015/0093287 | A1 | 4/2015 | Pederson et al. |

FOREIGN PATENT DOCUMENTS

| | | |
|---|---|---|
| CN | 101967581 A | 2/2011 |
| CN | 102605211 A | 7/2012 |
| CN | 102615403 A | 8/2012 |
| CN | 103320670 A | 9/2013 |
| CN | 103352175 A | 10/2013 |
| EP | 0250652 A1 | 1/1988 |
| GB | 741158 A | 11/1955 |
| GB | 782148 A | 9/1957 |
| GB | 815975 A | 7/1959 |
| GB | 850278 A | 10/1960 |
| GB | 911520 A | 11/1962 |
| GB | 939317 A | 10/1963 |
| GB | 965585 A | 7/1964 |
| GB | 1449134 A | 9/1972 |
| GB | 1346433 A | 2/1974 |
| GB | 1394449 A | 5/1975 |
| JP | H08157988 A | 6/1996 |
| JP | 2006283062 A | 10/2006 |
| JP | 2007100666 A | 4/2007 |
| JP | 2009030140 A | 2/2009 |
| JP | 2009041065 A | 2/2009 |
| JP | 2010150624 A | 7/2010 |
| JP | 2010229458 A | 10/2010 |
| KR | 20050026340 A | 3/2005 |
| RU | 2256713 C1 | 7/2005 |

OTHER PUBLICATIONS

Guclu, Titanium and Titanium Alloy Castings, 2008 ASM International, vol. 15, 2008, 1129-1142.

Hunt, The Latest Word on Aerospace Materials, AeroMat 25th Conference and Exposition presented by ASM International, Florida, Jun. 16-19, 2014, 1-8.

Ibrahim et al., Effect of Si-Addition as a Grain Refiner on Microstructure and Properties of Ti-6Al-4V Alloy, Transactions of Nonferrous Metals Society of China, 2013, 1863-1874.

Iijima et al., Diffusion of Silicon, Germanium and Tin in β-Titanium, Philosophical Magazine A, vol. 68, Issue 5, 1993, 901-914.

Lutjering et al., Titanium, Engineering Materials and Processes, Springer-Verlag, Berlin, 2003, 15-52.

Milosev et al., The Effect of Fluoride Ions on the Corrosion Behavior of Ti Metal, and Ti6-Al-7Nb and Ti-6Al-4V Alloys in Artificial Saliva, 2013, 543-555.

Semiatin et al., The Thermomechanical Processing of Alpha/Beta Titanium Alloys, The Journal of the Minerals, Metals & Materials Society, vol. 49, Issue 6, Jun. 1997, 33-68.

Woodfield et al., The Effect of Long-Term High Temperature Exposure on the Structure and Properties of the Titanium Alloy Ti5331S, Acta Metallurgica, vol. 36, Issue 3, 1988, 507-515.

* cited by examiner

TITANIUM ALLOYS AND THEIR METHODS OF PRODUCTION

PRIORITY INFORMATION

The present application claims priority to U.S. patent application Ser. No. 15/309,642 filed on Nov. 8, 2016, which is a 371 application of PCT/US2015/030601 filed on May 13, 2015, and claims priority to U.S. Provisional Patent Application Ser. No. 61/993,346 filed on May 15, 2014, the disclosures of which are incorporated by reference herein.

FIELD OF THE INVENTION

The present invention generally relates to titanium alloys and their method of production. In particular, the titanium alloys disclosed herein are particularly suitable for use in rotary machines, such as gas turbines.

BACKGROUND OF THE INVENTION

At least some known rotary machines such as, but not limited to, steam turbine engines and/or gas turbine engines, include various rotor assemblies, such as a fan assembly, a compressor, and/or turbines that each includes a rotor assembly. At least some known rotor assemblies include components such as, but not limited to, disks, shafts, spools, bladed disks ("blisks"), seals, and/or bladed integrated rings ("blings") and individual dovetail attached blades. Such components may be subjected to different temperatures depending on an axial position within the gas turbine engine.

For example, during operation, at least some known gas turbine engines may be subjected to an axial temperature gradient that extends along a central longitudinal axis of the engine. Generally, gas turbine engine components are exposed to lower operating temperatures towards a forward portion of the engine and higher operating temperatures towards an aft portion of the engine. As such, known rotor assemblies and/or rotor components are generally fabricated from materials capable of withstanding an expected maximum temperature at its intended position within the engine.

To accommodate different temperatures, different engine components have been forged with different alloys that have different material properties that enable the component to withstand different expected maximum radial and/or axial temperatures. More specifically, known rotary assemblies and/or rotary components are each generally forged from a single alloy that is capable of withstanding the expected maximum temperature of the entire rotary assembly and/or rotary component. For example, Ti-17 (Ti-5Al-4Mo-4Cr-2Sn-2Zr), Ti-6246 (Ti-6Al-2Sn-4Zr-6Mo), and Ti-64 (Ti-6Al-4V) can be utilized for rotary components within a gas turbine engine depending on the part's relative position within the engine.

Components such as blisks or integrally bladed rotors can also be fabricated from one or more alloys using solid state welding joining processes, In the case of a bi-metallic blisk, the hub may be produced from one alloy such as beta processed Ti-6246 or beta processed Ti-17 having excellent thick section properties, while the airfoil may be produced from a second alloy such as alpha plus beta processed Ti-64 having excellent fatigue properties in relatively small section sizes and foreign object damage (FOD) properties. Thick section, as used herein, refers to sectional size of exemplary components made from titanium alloys, for example, larger than about one to two inches in section, or another example from about one inch to 3 inches, again another example up to six inches or more. The airfoil may be solid state welded to the hub utilizing processes such as translation friction welding or linear friction welding. Blisks may also be solid state welded using a hub and an airfoil of the same alloy such as alpha plus beta processed Ti-64, where the alpha plus beta processed Ti-64 hub properties are sufficient for the application. Components such as compressor rotor drums may also be fabricated from one or more alloys using solid state welding joining processes such as inertia welding. For an inertia welded rotor, it may be desirable to have a higher temperature alloy used in the later stages of the rotor.

Ti-64 is an alpha/beta processed titanium alloy that is highly manufacturable, has relatively isotropic properties, has a relatively low density, is tolerant to foreign object damage (FOD), is relatively easy to repair, and is relatively low cost. However, Ti-64 has limited thick section strength and high-cycle fatigue (HCF) capability, especially at low A ratio (where A is the ratio of alternating stress divided by the mean stress), and deforms to a relatively high degree during FOD. In contrast, Ti-17 and Ti-6246 are beta processed, are not as easily manufacturable, have more anisotropic properties (especially ductility) as a result of beta processing, have higher density, are not as tolerant to FOD, are not as easily weldable or repairable, and have a higher cost. However, Ti-17 and Ti-6246 have good thick section strength, have good HCF capability, have a superior temperature capability than Ti-64, and deform relatively less than Ti-64 during FOD impact.

As such, a need exists for a low cost titanium alloy that has the good qualities of Ti-64 (e.g., relatively isotropic properties, a relatively low density, is tolerant to FOD and does not deform too much during the FOD, and is repairable) with some of the benefits of Ti-17 and Ti-6246 (e.g., thick section tensile strength, and HCF strength).

BRIEF DESCRIPTION OF THE INVENTION

Aspects and advantages of the invention will be set forth in part in the following description, or may be obvious from the description, or may be learned through practice of the invention.

A composition of matter is generally provided, in one embodiment, a titanium alloy comprising about 5 wt % to about 8 wt % aluminum; about 2.5 wt % to about 5.5 wt % vanadium; about 0.1 wt % to about 2 wt % of one or more elements selected from the group consisting of iron and molybdenum; about 0.01 wt % to about 0.2 wt % carbon; up to about 0.3 wt % oxygen; silicon and copper; and titanium.

A turbine component is generally provided, in one embodiment, that comprises an article made from a titanium alloy having about 5 wt % to about 8 wt % aluminum; about 2.5 wt % to about 5.5 wt % vanadium; about 0.1 wt % to about 2 wt % of one or more elements selected from the group consisting of iron and molybdenum; about 0.01 wt % to about 0.2 wt % carbon; up to about 0.3 wt % oxygen; at least one of silicon or copper; and titanium.

Methods are also generally provided for making an alloy component having a beta transus temperature and a titanium silicide solvus temperature, with method steps comprising; hot working a titanium alloy ingot at a temperature that is above the beta transus temperature, wherein the titanium alloy ingot comprises about 5 wt % to about 8 wt % aluminum; about 2.5 wt % to about 5.5 wt % vanadium; about 0.1 wt % to about 2 wt % of one or more element selected from the group consisting of iron and molybdenum; about 0.01 wt % to about 0.2 wt % carbon; up to about 0.3 wt % oxygen; up to 2 wt % of one or more element selected from the group consisting of zirconium and tin; at least one of silicon or copper; and titanium; hot working the titanium alloy ingot at a temperature that is below both the beta transus temperature of the alloy and the silicide solvus temperature; hot working the titanium alloy ingot at a temperature that is above the beta transus temperature but below the titanium silicide solvus temperature; hot working the titanium alloy ingot at a temperature that is below both the beta transus temperature of the alloy and the silicide solvus temperature, thereby forming a billet; hot working the billet at a temperature below both the beta transus temperature of the alloy and the silicide solvus temperature to form a forging; and solution heat treating the forging at a temperature below the beta transus and the silicide solvus temperature.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures, in which:

DETAILED DESCRIPTION OF THE INVENTION

Reference now will be made in detail to embodiments of the invention, one or more examples of which are illustrated in the drawings. Each example is provided by way of explanation of the invention, and is not a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

It should be appreciated that "axial" and "axially" are used throughout this application and reference directions and orientations that are substantially parallel to a central rotational axis of the rotary machine. It should also be appreciated that "axial-circumferential edge" is used throughout this application to refer to circumferential edges that are orientated substantially perpendicular to the central rotational axis of the rotary machine. It should also be appreciated that the terms "radial" and "radially" are used throughout this application to reference directions and orientations that are substantially perpendicular to the central rotational axis. It should also be appreciated that "radial-circumferential plane" is used throughout this application to reference planes orientated substantially perpendicular to the central rotational axis of the rotary machine. Moreover, it should be appreciated that "forward" is used throughout this application to refer to directions and positions located upstream and towards an inlet side of a gas turbine engine, and that "aft" is used throughout this application to refer to directions and positions located downstream and towards an exhaust side of the gas turbine engine.

A composition of matter in the class of titanium alloys is generally provided. A component is also provided that is formed from the titanium alloy modified from Ti-64 in order to preserve the desired properties of Ti-64 (e.g., relatively isotropic properties, a relatively low density, tolerance to FOD, repairability, and low cost) while improving the thick section strength, HCF capability, creep strength, and low deformation following FOD to approach those beneficial aspects of Ti-17 and Ti-6246. The cost of the new modified Ti-64 alloy can be minimized by designing the composition such that a high percentage of widely available Ti-64 recycled materials can be used. Additionally, the billet and forge processing approach may be kept as close to Ti-64 as possible in order to minimize cost.

Figure 1:
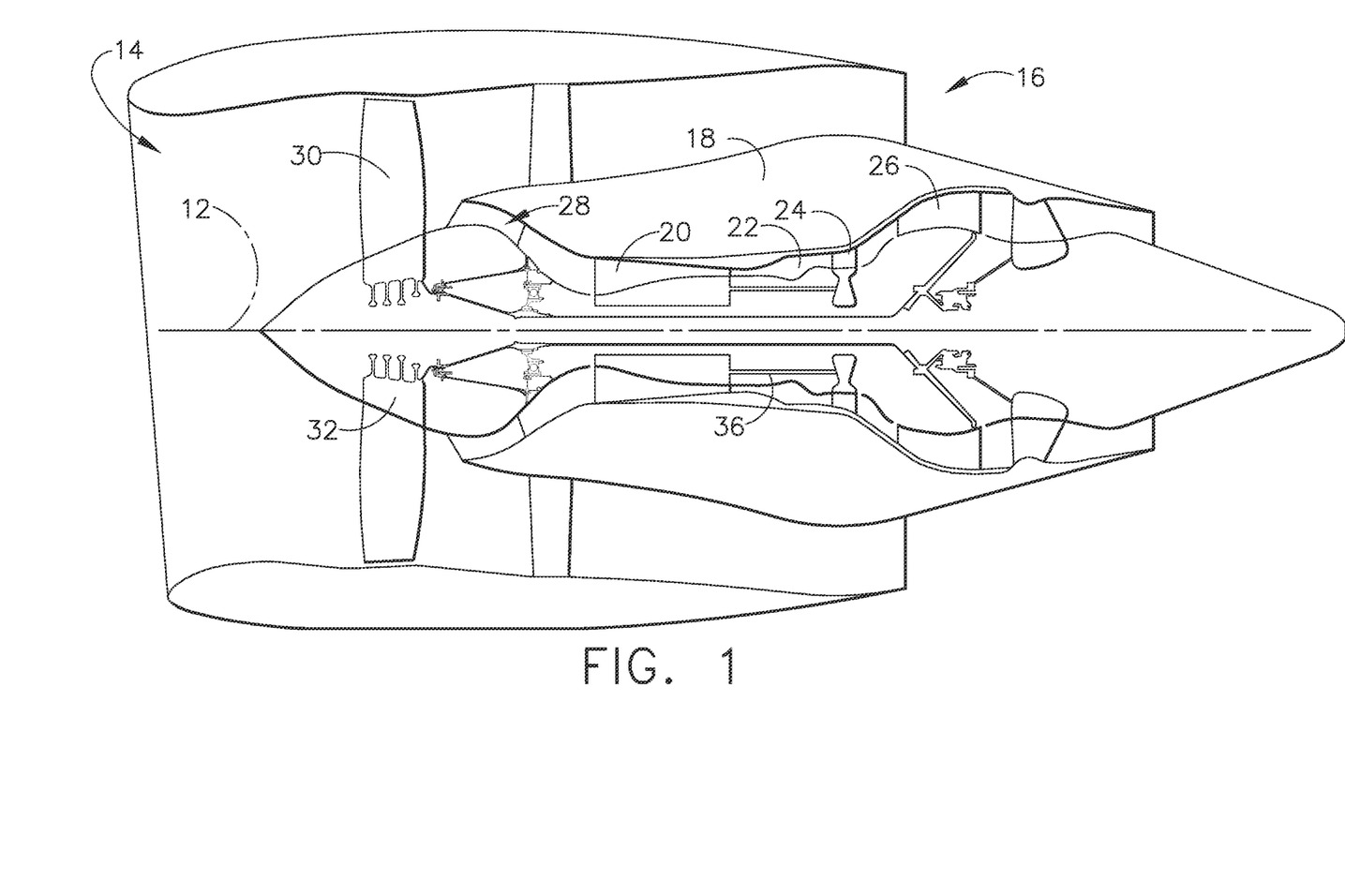
FIG. 1 is a schematic illustration of an exemplary turbofan gas turbine engine assembly.

As stated, a component within a turbofan engine assembly, such as shown in FIG. 1, can be constructed from a titanium alloy. The titanium alloy includes, in one embodiment, about 5 wt % to about 8 wt % aluminium (e.g., about 6 wt % to about 7 wt % aluminium); about 2.5 wt % to about 5.5 wt % vanadium (e.g., about 3 wt % to about 5 wt % vanadium, such as about 3.5 wt % to about 4.5 wt % vanadium); about 0.1 wt % to about 2 wt % iron (e.g., about 0.1 wt % to about 1 wt % iron, such as about 0.1 wt % to about 0.6 wt % iron); about 0.01 wt % to about 0.2 wt % carbon (about 0.01 wt % to about 0.1 wt % carbon); at least one of silicon or copper, with the combined amount of silicon and copper being about 0.1 wt % to about 4 wt % (e.g., about 0.1 wt % to about 2 wt % silicon and/or about 0.5 wt % to about 4 wt % copper, such as about 0.5 wt % to about 2 wt % copper); optionally, up to about 0.3 wt % oxygen (e.g., up to about 0.2 wt % oxygen, such as about 0.1 wt % to about 0.2 wt %); optionally up to about 0.05 wt % nitrogen (e.g., up to about 0.01 wt % nitrogen, such as about 0.001 wt % to about 0.01 wt % nitrogen); optionally, up to about 2 wt % molybdenum (e.g., about 0.5 wt % to about 1.5 wt % molybdenum, such as about 0.5 wt % to about 1 wt %); optionally, up to about 2 wt % tin (e.g., about 0.5 wt % to about 2 wt % tin, such as about 0.5 wt % to about 1 wt % tin); optionally, up to about 2 wt % zirconium (e.g., about 0.5 wt % to about 2 wt % zirconium, such as about 0.5 wt % to about 1 wt % zirconium); optionally, up to about 2 wt % tungsten (e.g., about 0.1 wt % to about 2 wt % tungsten, such as about 0.1 wt % to about 1 wt % tungsten); and the balance titanium.

Stated differently, the titanium alloy includes, in one embodiment, titanium; about 5 wt % to about 8 wt % aluminum; about 2.5 wt % to about 5.5 wt % vanadium; about 0.1 wt % to about 2 wt % iron; about 0.01 wt % to about 0.2 wt % carbon; and at least one of silicon or copper, with the combined amount of silicon and copper being about 0.1 wt % to about 4 wt % (e.g., about 0.1 wt % to about 2 wt % silicon and/or about 0.5 wt % to about 2 wt % copper). The titanium alloy can also optionally include up to about 0.3 wt % oxygen (e.g., about 0.1 wt % to about 0.2 wt % oxygen), up to about 0.05 wt % nitrogen (e.g., about 0.001 wt % to about 0.05 wt % nitrogen); up to about 2 wt % molybdenum (e.g., about 0.5 wt % to about 1 wt % molybdenum); up to about 2 wt % tin (e.g., about 0.5 wt % to about 2 wt % tin); up to about 2 wt % zirconium (e.g., about 0.5 wt % to about 2 wt % zirconium), up to about 2 wt % tungsten (e.g., about 0.1 wt % to about 2 wt % tungsten), or combinations thereof.

For example, the compositional ranges set forth above can be summarized as shown in Table 1 below:

TABLE 1

Exemplary Compositional Ranges

| Component | Range (wt %) | Range (wt %) | Range (wt %) |
| --- | --- | --- | --- |
| Al | 5-8 | 6-7 | 6-7 |
| V | 2.5-5.5 | 3-5 | 3.5-4.5 |
| Fe | 0.1-2 | 0.1-1 | 0.1-0.6 |
| C | 0.01-0.2 | 0.01-0.1 | 0.01-0.1 |
| without any Cu, Si | 0.1-2 | 0.5-2 | 0.5-1 |
| with Cu, Si | 0-2 | 0-1 | 0-1 |
| without any Si, Cu | 0.5-4 | 0.5-2 | 0.5-1 |
| with Si, Cu | 0-4 | 0-2 | 0-1 |
| O | 0-0.3 | 0-0.2 | 0.1-0.2 |
| N | 0-0.05 | 0-0.01 | 0.001-0.01 |
| Mo | 0-2 | 0.5-1.5 | 0.5-1 |
| Sn | 0-2 | 0.5-2 | 0.5-1 |
| Zr | 0-2 | 0.5-2 | 0.5-1 |
| W | 0-2 | 0.1-2 | 0.1-1 |
| Ti | Balance | Balance | Balance |

Figure 2:
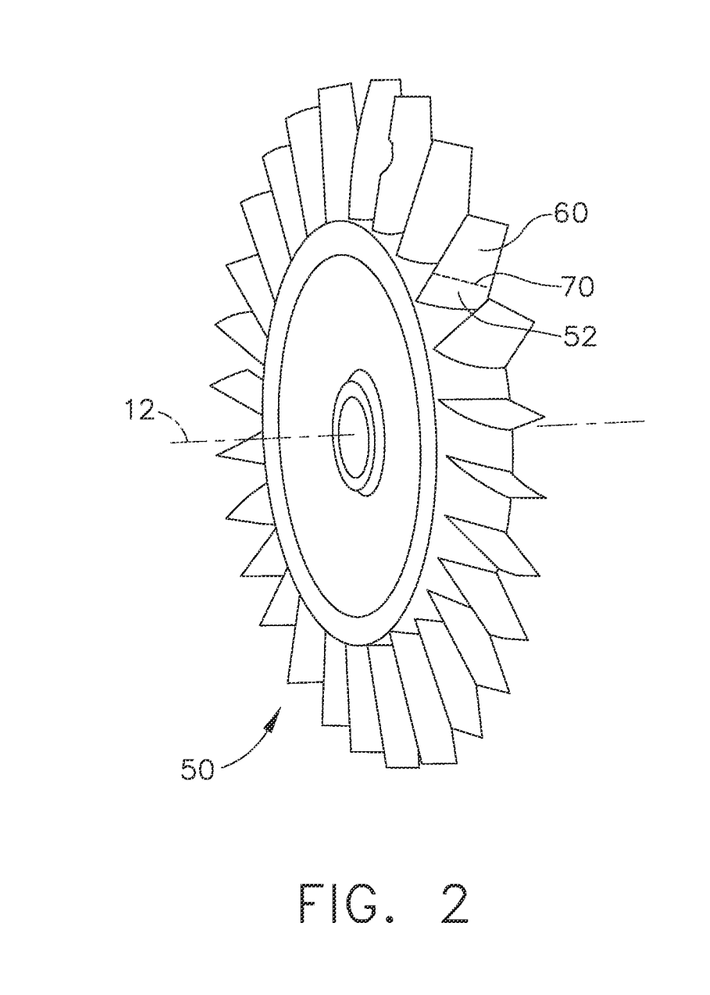
FIG. 2 is an isometric view of a blisk.

FIG. 2 shows an example of a component that may be constructed from a titanium alloy, depicting an isometric view of a single stage blisk 50, alternatively known as an integrally bladed rotor. The blisk 50 has a hub 52 that circumscribes the central rotational axis 12, reference also the axis 12 of turbofan engine assembly 10 of FIG. 1. Extending substantially radially from hub 52 are airfoils 60. In the high-pressure compressor 20 of FIG. 1, to optimize the blisk for performance parameters such as, for example, fatigue life, FOD tolerance, and creep strength, a bi-metallic blisk, where the hub 52 and airfoils 60 are different alloys, may be preferred. The airfoil 60 may be solid state welded to the hub 52 utilizing processes such as translation friction welding or linear friction welding. Therefore, it may be desirable to select a material that provides excellent thick section properties for the hub 52, and excellent fatigue properties in relatively small section sizes and FOD properties for the airfoil 60.

In the exemplary embodiment shown in FIG. 2, hub 52 is made from an example inventive alloy of the present invention, with the airfoil 60 being made from a commercially available, or conventional, materials with desirable fatigue life performance, such as, for example Ti-64. After welding, the interface between hub 52 and airfoil 60 can be referred to as the weld or heat affected zone 70. In this zone 70, a mix of hub and airfoil alloys are present, along with a wide range of microstructures. This mix of alloys and range of microstructures may compromise the thick section fatigue, FOD, etc. of the portion of the blisk 50.

In another exemplary embodiment, hub 52 and airfoil 60 are both made from the same example inventive alloy of the present invention, or made from separate example inventive alloys of the present invention. In the case of the hub 52 and airfoil 60 being the same inventive alloy, in zone 70, no mix of hub and airfoil alloys are present, but a wide range of microstructures exists. This range of microstructures may again compromise the thick section fatigue, FOD, etc. of the portion of the blisk 50.

Figure 3:
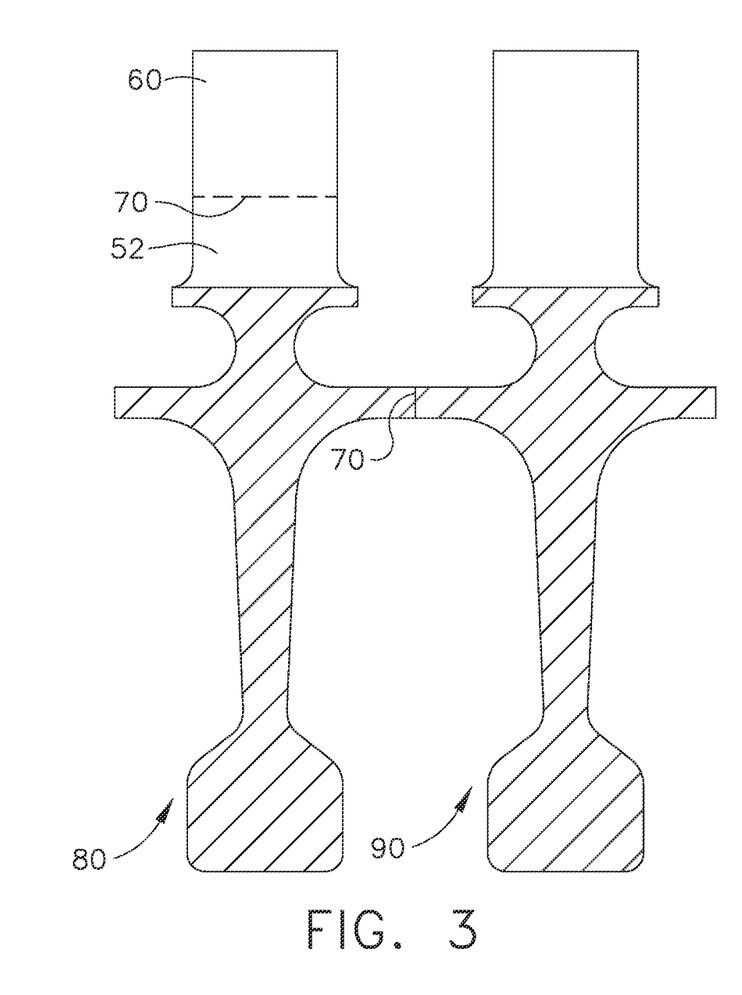
FIG. 3 is sectional view through two stages of blisks depicting optional location for weld zones.

To optimize the mass of rotating components (via eliminating bolted joints), and to take advantage of higher temperature materials, in a high pressure compressor 20, shown in FIG. 1, adjacent stages of blisks may be inertia welded. Similar to the bi-metallic hub/airfoil, it may be desirable to have a front blisk stage made from a first material and an aft stage blisk made from a second material. As shown in FIG. 3, the front blisk stage 80 may be made from an example inventive alloy of the present invention and the aft blisk stage 90 may be made from conventional material, such as, for example Ti-17. Again the weld zone or heat affected zone 70 is present and a mix of front blisk and aft blisk alloys are present, along with a wide range of microstructures in zone 70, representing an area of reduced material properties.

In other exemplary embodiments, adjacent front blisk stage 80 and aft blisk stage 90 are both made from the same example inventive alloy of the present invention, or may be made from separate example inventive alloys of the present invention.

Furthermore, for the embodiments described by FIG. 2 and FIG. 3, any example inventive alloy may be used alone or in combination with commercially available alloys for one or more of the airfoil 60, hub 52, blisk 50, front stage blisk 80 or back stage blisk 90. Although FIG. 3 describes two stages, more than two stages of blisks may be contemplated.

While materials may be selected for these properties alone, consideration should be made for recovering material property loss due to the weld-induced thermal environment seen in a translation friction welding or linear friction welding via post treatment, such as, for example, furnace heat treatment. As will be discussed below, the alloy of the present invention pairs well with commercially available titanium alloys, allowing manufacturers to take full advantage of this bi-metallic material property benefit by, for example, better matching heat treatment temperatures and processing between the hub 52 material and airfoil 60 material and between the materials of adjacent blisk stages 80 and 90. These benefits can also be realized when the alloy of present invention is welded with itself, not only with commercially available titanium alloys.

Turning now to alloy manufacturing, in the ingot manufacturing process of these titanium alloys, the elements can be altered from Ti-64 to impact the microstructure and beta transus approach curves to refine the microstructure ($\alpha_p$ and lamellar morphology). For example, C, O, and N interstitials act as a stabilizers and can be present for solid solution strengthening. On the other hand, Cu, Mo, Fe, Si, and W act as β stabilizers, and may serve to increase hardenability. However, too much of Mo, Fe, and/or W can increase the density to levels too high, and/or may have the potential to form deleterious phases during rapid cooling following solid state welding. For example, following solid-state welding of Ti-64 to itself (e.g., via inertia welding of one disk to another to form a spool, or translation friction welding of a blade to a disk to form a blisk), the weld zone may contain hexagonal martensitic alpha prime (hexagonal phase) that is relatively easy to decompose to alpha phase and precipitate out beta phase on subsequent stress-relief/aging treatment. It is useful to note that for Ti-64, the alpha prime martensite start and finish temperatures are above room temperature. In contrast to Ti-64, alloys with increased beta stabilizer content can have martensite start and finish temperatures which can be lowered toward and below room temperature. For example, Ti-6246 will have lower martensite start and finish temperatures than Ti-64, showing a tendency to retain higher amounts of beta (martensite finish is below room temperature) and may form a percentage of orthorhombic martensite (indicating martensite start is above room temperature). Further, the lower Al content and combination of Mo and Cr in Ti-17 produce a more heavily beta stabilized composition which may have both martensite start and martensite finish suppressed to below room temperature, so may show fully retained beta following rapid quenching from high temperatures, e.g. as may occur in a solid state weld. In the case of retained beta, it may be difficult to form alpha and beta phases of desired sizes and distribution following a conventional stress relief/age heat treatment. This occurs because retained beta may also contain fine metastable athermal omega (termed to refer to following rapid quenching) or metastable omega (termed to distinguish a modest maturation beyond athermal omega) that transforms readily at lower temperatures, e.g. well below those applied during conventional stress relief and age heat treatment temperatures. This transformation of omega phase can occur during reheating of a component on the rise to the final stress relief and age heat treatment temperature. Associated with the transformation of metastable omega is a parallel presentation of increasing amounts of equilibrium alpha precipitates, the number density of which is increased by the presence and maturation of omega. This early, lower temperature conditioning toward an increased number of alpha precipitates persists to the final stress relief and age heat treatment temperature, resulting in a very fine alpha+beta microstructure that is very strong, but also has less ductility and toughness. Higher temperature stress relief/age heat treatment temperatures can be used to coarsen the fine alpha+beta weld microstructure, but these may then affect the balance of properties that can be maintained in the base metal away from the weld, i.e. unacceptably lowering strength and fatigue capability away from the weld to gain toughness in the weld. In the case of orthorhombic martensite that may form in a Ti-6246 weld, it is again more difficult to decompose this phase to an acceptable size and distribution of equilibrium alpha and beta following a conventional stress relief/age heat treatment than it is when applying a similar stress relief/age heat treatment to hexagonal martensite in Ti-64. Thus, these facts teach that development of base alloy compositions must account for expected transient, non-equilibrium microstructures that will form following application of intended manufacturing methods, e.g. the martensitic and retained beta+omega microstructures mentioned above, that naturally form following solid state welding. Accordingly, new alloy compositions are presented herein—where additional beta stabilizers (Fe, Cu, Si, and/or Mo) are added to levels that still result in formation of predominantly hexagonal, alpha prime martensite (thus solid state welds can be toughened with standard stress relief/age heat treatment without impacting base metal properties), while providing additional hardenability (refined microstructure) over Ti-64 to have better thick section properties than Ti-64. Further, if sufficient levels of beta stabilizing elements are added to the base composition, such that orthorhombic martensite and/or omega phases are produced in a solid state weld, the base alloy composition is designed such that it can be stress relieved and/or aged at a high temperature, for example at about 1300° F. or higher, enabling sufficiently high toughness in the weld to be achieved, whilst not adversely affecting the base alloy strength and fatigue. Stated differently, the new compositions that are especially useful in thick section components, and do not rely predominantly on rapid cooling and aging to achieve higher strength via fine alpha precipitation such as Ti-6246 and Ti-17. Rather, they rely on alternative strengthening mechanisms that remain effective, even at slower cooling rates from solution heat treatment temperature that may be experienced in a large section size component.

In the case of a translation friction welded bi-metallic blisk, use of the inventive alloy as the hub in place of beta processed Ti-17 or beta processed Ti-6246, and Ti-64 as the airfoil will result in a better matching of flow stresses and microstructures between the inventive alloy hub and the Ti-64 alloy airfoil. This may result in a solid state weld having a lower tendency to form defects during or following the welding process.

I. Processing with Silicon Present in the Alloy

As stated, the titanium alloy includes, in one embodiment, about 0.1 wt % to about 2 wt % silicon (e.g., about 0.5 wt % to about 2 wt %, such as about 0.5 wt % to about 1 wt %). The inclusion of Si in the titanium alloy leads to increased strength and potentially increased HCF strength due to solid solution strengthening and/or strengthening via the presence of particles containing Si. Additionally, Si can lead to a refined microstructure in the titanium alloy, which can result in increased strength and potentially increased HCF strength. During processing, depending upon the level of Si in the alloy, Si in solution can precipitate as a titanium silicide compound. The titanium silicide compound can be any compound containing both titanium and silicon (e.g., $Ti_5Si_3$, $Ti_3Si$, etc.), with or without other elements (e.g., Sn and/or Zr) within the compound.

When Si is included as a component in the titanium alloy, the alloy composition can be designed with sufficient silicon such that the silicide solvus temperature of the titanium silicide compound is sufficiently above the beta transus temperature of the alloy. For example, the silicide solvus temperature of a titanium silicide compound can be at least about 50° F. greater than the beta transus temperature of the alloy (e.g., about 75° F. to about 400° F. greater than the beta transus temperature of the alloy).

The difference in the silicide solvus temperature and the beta transus temperature of the alloy can allow processing of the ingot/billet in the beta plus silicide phase field. However, if there is significant variation in silicon within the ingot as a result of segregation during solidification, during subsequent billet processing intended to be in the beta plus silicide phase field, it is possible that in local regions that are depleted in silicon relative to the overall composition, this local region may actually be above the local silicide solvus. These areas with different silicon content can be reduced via a homogenization treatment (as discussed below) to produce a volume fraction and size of the silicide particles that are sufficiently small and spaced apart to lead to a finer beta grain structure after subsequent processing. On the other hand, if the silicide particle volume fraction and/or size are not appropriate, even though the billet is recrystallized in the beta plus silicide phase field, a uniform, very refined beta structure may not be achievable. Regions enriched in silicon content due to segregation may also result locally in material being above the beta transus during treatments intended to be below the beta transus. If this occurs, it is believed (without wishing to be bound by any particular theory) that in these silicon-enriched regions, silicide particles will form with these particles pinning the beta grains. Thus, even though these silicon-enriched regions may be above the local beta tranus, a refined microstructure may be retained during alpha beta processing, such as billet forging, component forging and/or solution heat treatment.

The retardation of grain growth by the presence of second phase particles was originally investigated theoretically by Zener. This problem has not been resolved completely, with specific alloy system solutions being quite complex, having to take into consideration many factors describing the interaction of particles with the moving grain boundaries. Still, a generic description comes down to a form of $$Pz = C_3(\gamma_s f/d)$$

where Pz=Zener drag pressure
$C_3$=geometrical constant that can vary substantially, up to 5×
$\gamma_s$=grain boundary interfacial energy
f=volume fraction of second phase particles
d=mean diameter of particles indicating finer particles at higher volume fractions provide increased drag effects. Reference to drag influences from second phase particles in the 1-10% volume fraction and 1-10 micron mean diameter are common. There is significant disagreement within the art as to how the grain boundary interacts with and wraps around the second phase particle, which moves the value of $C_3$ around.

Figure 4:
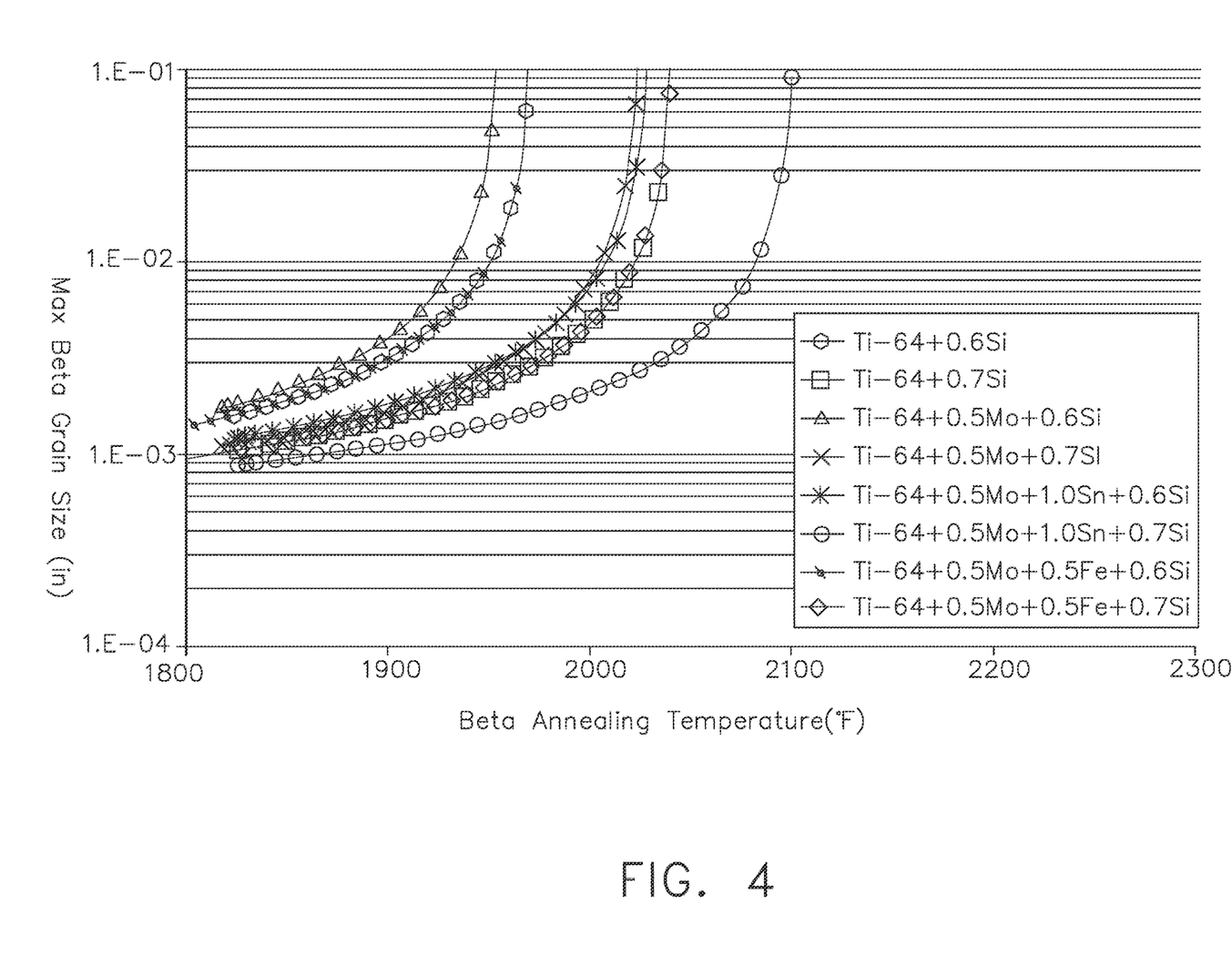
FIG. 4 shows a chart of the maximum beta grain size for certain alloy compositions with respect to the beta annealing temperature.

Referring to FIG. 4, a maximum predicted recrystallized beta grain size as a function of annealing temperature in a two phase material may be represented by the equation: $D_{max} = r_p/f$ with $r_p$=particle radius and f=initial volume fraction. Calculations for several alloys with assumed particle sizes and volume fractions suggest a recrystallized beta grain sizes on the order of about 1 to about 100 mils may be expected.

Thus, the alloy composition is, in one particular embodiment, formed with the silicide solvus sufficiently higher than the beta transus such that the processing scheme described below is practical. For example, in certain embodiments, the titanium alloys disclosed herein can have a beta transus temperature of about 1700° F. to about 1950° F. and a silicide solvus temperature of about 1775° F. to about 2200° F.

During processing of the alloy, Si tends to segregate during solidification. As such, a homogenization treatment can optionally be performed prior to any subsequent processing steps in order to smooth out the local peak/trough in the Si composition in the ingot. That is, a more uniform distribution of Si in the alloy with smaller sizes can be formed to create the potential for finer beta grain recrystallization when recrystallized in the beta plus silicide phase field. For example, a homogenization treatment can be performed at a treatment temperature that is above both the beta transus temperature of the alloy and the silicide solvus temperature of the titanium silicide compounds. The diffusivity of Si in Ti-64 appears to be faster than that determined from the binary Ti—Si system, resulting in a potentially lower homogenization temperature and/or shorter homogenization time, reference Iijima, Y., Lee, S. Y., Hirano, K. (1993) Phil. Mag. A 68: pp. 901-14, the disclosure of which is also incorporated by reference herein. Alternatively, the homogenization treatment may be performed after a portion of the hot working billet operations. A further potential advantage of a homogenization treatment is as follows: if during solidification, the local silicon concentration is above a certain level, and/or the cooling rate is below a certain rate, silicon-rich particles may precipitate. Above a certain size range in the final heat treated condition, these particles may reduce mechanical properties such as fatigue, ductility, impact resistance and weldability. Use of a homogenization treatment and optionally a controlled cooling above a certain rate will result in either complete dissolution of these particles, or precipitation of a finer particle during cooling, resulting in improvements in properties such as fatigue, ductility, impact resistance and weldability. During subsequent processing steps, additional silicon-rich particles may be expected to form, however, the size of these particles will likely be smaller than those produced during initial solidification and cooling.

Whether or not any homogenization treatment is performed, the alloy is subjected to high temperature beta processing at beta processing temperatures that are above both the beta transus temperature of the alloy and the silicide solvus temperature of the titanium silicide particles. For example, the high temperature beta processing can be carried out from just above to several hundred degrees above the silicide solvus temperature (e.g., about 10° F. above to about 400° F. above). This high temperature beta processing can help assure that the alloy is substantially all in the beta phase.

Following the high temperature beta processing, the alloy billet can then be subjected to lower temperature alpha/beta work at temperatures below both the beta transus temperature of the alloy and the silicide solvus temperature. This alpha/beta work is at least partially retained, and leads to recrystallization in the following or subsequent step.

Following the alpha/beta work, the alloy billet can then be subjected to beta processing (e.g., an annealing operation or a beta forging operation, see Lutjering, G., Williams, J. C. (2003) Titanium. Springer-Verlag, Berlin, and Semiatin S. L., et. Al, (1997) JOM 49(6), 33-39, the disclosures of which are also incorporated by reference herein at a beta processing temperature that is above the beta transus temperature of the alloy but below the silicide solvus temperature of the titanium silicide compounds. Thus, this beta processing can recrystallize the beta grains to a finer size. As discussed above, the volume fraction and particle size of the titanium silicide compounds can impact the beta grain size recrystallized here. Upon completion of this beta processing step, the alloy billet can be subjected to a post-beta processing cooling process using a variety of cooling techniques known to those skilled in the art, such as, but not limited to, fan air, oil, gas, and water quenching, to produce a post-forged cooled article. In one embodiment, the alloy billet is cooled as fast as possible to minimize the size of the microstructure formed at room temperature. During quenching, the beta phase begins to transform to alpha phase below the beta transus temperature. However, fast quenching leads to thinner alpha platelets formed, which later transforms into smaller alpha particles in subsequent alpha/beta work and, in turn, controls HCF in the resulting article.

A subsequent alpha/beta work step is then typically performed, which is designed to convert the alpha platelets into primary (or equiaxed) alpha particles with as small of a size as possible, at temperatures below both the beta transus temperature of the alloy and the silicide solvus temperature. This alpha/beta work, in combination with the beta processing steps above, leads to much smaller prior beta grain sizes, which in turn results in significantly finer alpha colony size (with each colony being an organization of plates having a similar crystal orientation). Following the second alpha/beta processing step, the primary alpha grain size can be smaller because it started out with thinner platelets (compared to that in alpha/beta processed Ti-64), which leads to improved strength and HCF properties. It should also be noted that the much finer colony sizes result in improved ultrasonic inspectability at the billet and component stage.

The processed billet can then be alpha/beta forged at forging temperatures below both the beta transus temperature of the alloy and the silicide solvus temperature. It should be noted that the cooling rate used for the post-forged cooling process can be dependent on several factors.

The post-forged cooled article can then be solution heat treated to a temperature below the beta transus and the silicide solvus temperature (e.g., a temperature from about 50° F. to about 250° F. below the beta transus) but at a temperature above the alpha/beta component forged processing temperature, and held for a certain time to ensure that the entire part is at the heat treatment temperature (e.g., up to about 4 hours) to produce a solution heat-treated article containing particles of primary alpha in a matrix of beta phase.

This solution heat-treated article can then be subjected to a controlled post-solution cooling process to produce a post-solution cooled article. The cooling rate following post solution heat treatment is generally desired to be as quick as possible. For example, the controlled post solution-cooling rate in articles having a cross-section size on the order of 6 inches or more may be faster than about 100° F./minute, calculated from an approximately linear cooling rate (e.g., from about 25-50° F. below the solution temperature to the beginning of the secondary alpha precipitation). For example, by water quenching, the cooling occurs as quickly as possible. However, in the thicker sections of the article, there are inevitably slower cooling rates, particularly within the thickness of the article. Thus, in one embodiment, the alloy structure is designed (e.g., via pre-machining) such that the slower cooling rates (associated with these thicker parts) are minimized and/or controlled such that improvements in strength/HCF with good ductility are realized.

Methods suitable for use in the solution heating process will be known to those skilled in the art. Examples of solution heat-treating methods can include heat-treating in air, vacuum, or inert (i.e. argon) atmospheres. The controlled post-solution cooling process can have the most significant impact on achieving the strength (particularly HCF) and desired ductility and may again involve a variety of cooling techniques known to those skilled in the art, such as fan air, oil, gas, polymer, salt and water quenching.

Alternatively, solution heat treatment can be conducted above the beta transus, but below the silicide solvus. This processing method results in a fine-grained, beta-annealed structure (e.g., good for airframe components) in that the resultant structure has similar fatigue crack growth properties to a Ti-64 beta annealed structure, but because the beta grain size is smaller, and the presence of Si and/or Cu, and Fe and/or Mo, thick section strength and HCF will be better. The billet and forge processing can be streamlined, for example, including initial beta hot work followed by alpha-beta hot work to form the forging from the billet prior to solution heat treatment of the forging above the beta transus but below the silicide solvus.

Optionally, prior to solution heat treatment, the forging can be pre-machined in order to increase the cooling rate to further increase strength and HCF properties. Additionally or alternatively, the configuration of the post forged cooled article, which may involve rough machining after the final forge operation, and the specific cooling method, may be selected to achieve the desired controlled post-solution cooling rate range. In portions of the article where ductility may be of less concern, controlled post-solution cooling rates above the desired range are acceptable. Similarly, controlled post-solution cooling rates that fall below the desired range are acceptable in portions of the article where lower strength or HCF is allowable.

After the controlled post-solution cooling, the post-solution cooled article may be subjected to an aging and/or stress relief heat treatment at a temperature of from about 1100° F. (about 593° C.) to about 1350° F. (about 732° C.) or higher for a period of about 1 hour to about 8 hours, followed by uncontrolled cooling to about room temperature, to produce a final article. A temperature less than 1100° F. may be used, but may require a longer time. It is known that the addition of too high a level of Si may result in reduced ductility and/or toughness due to the presence of silicide particles and/or a greater tendency to form ordered $Ti_3Al$ particles in the alpha phase, see, for example, Woodfield, A. P. et. al (1988) *Acta Metallurgica*, 36(3), 507-515, the disclosure of which is also incorporated by reference herein. For a given composition, the volume fraction of primary alpha present during solution heat treatment will set the local primary alpha composition, and therefore its tendency to form ordered $Ti_3Al$ particles during subsequent age and/or stress relief treatments. If ordered $Ti_3Al$ particles have a tendency to form during the aging and/or stress relief heat treatment, the temperature can be increased to above the $Ti_3Al$ solvus. In this case, it may be necessary to control the cooling rate after heat treatment to minimize the formation of $Ti_3Al$ particles. If a subsequent aging and/or stress relief temperature is required, then the degree of formation of $Ti_3Al$ particles and impact to properties such as ductility and toughness needs to be considered when selecting the subsequent heat treatment.

When Si is included in the Ti alloy, the alloy composition may be designed with a level of Si such that the silicide solvus is below the beta transus, or Si may be entirely in solution, Billet and component forging and heat treatment approaches for this range of alloy compositions may be conducted in a similar manner to conventional Ti-64 processing. Thus, the ingot may be optionally homogenized, then beta forged followed by an alpha-beta pre-strain, followed by a beta anneal or beta forge, with final billet processing performed below the beta transus. All subsequent component forge and heat treatment steps may then be conducted below the beta transus. Any silicides present at alpha beta processing and/or heat treatment temperatures may prevent local beta grain coarsening, and primary alpha coarsening during thermomechanical processing and/or heat treatment. As noted above, it is possible that even with lower levels of Si, ordering of the alpha matrix may still occur, depending on the volume fraction of primary alpha and levels of other elements such as Al, O, C and/or N added to the alloy. If this occurs, then aging and/or stress relief heat treatment temperatures and/or times may need to be adjusted.

II. Processing with Copper Present in the Alloy

When Cu is included as a component in the alloy composition, with or without Si present, Cu may form a titanium copper compound precipitate (e.g., $Ti_2Cu$) at relatively low temperatures (e.g., about 800° F. to about 1000° F. or higher, depending upon the level of Cu in the alloy) in the titanium alloys, which may strengthen the alpha phase resulting in improved strength and HCF properties. The addition of Cu may also lead to refinement of both primary and secondary alpha phases which may also result in improved strength and HCF properties.

Like Si, Cu also tends to segregate during solidification, so the optional homogenization treatment described above (above the beta transus temperature) may be utilized to smooth out the peak/trough of the Cu composition in the ingot, or may be performed following a portion of the billet hot working operations to covert the ingot into a billet. The optional homogenization treatment may also dissolve any primary titanium copper compound precipitates that may be relatively large in size.

When copper is present in the alloy, without Si present, then the process for forming the alloy article can be similar to that of the alloy Ti-64 (e.g., initial beta work, alpha/beta pre-strain, beta forging or annealing to recrystallize the beta grains, and final alpha/beta billet processing), with an optional homogenization process (such as described above) prior to processing or after a portion of the billet processing, and an aging treatment after all billet and component processing (including any welding operations, such as inertia welding) to bring out the strength properties from Cu.

With Cu present, the alloy can then be designed such that following billet conversion and part forging plus heat treatment and quenching (such as described above), an additional lower temperature age treatment can be employed to precipitate out $Ti_2Cu$ or other titanium-copper-containing particles, leading to improved strength and HCF properties.

For example, the copper containing titanium alloy ingot can be high temperature beta processed above the beta transus temperature of the alloy, followed by lower temperature alpha/beta processing at temperatures below the beta transus temperature of the alloy, and then processed through a subsequent high temperature beta process followed by water quenching. The final alpha/beta work can then be performed at temperatures below the beta transus temperature of the alloy. Component forging can then be performed at temperatures below the beta transus of the alloy. Finally, solution heat treatment can then be performed at temperatures below the beta transus temperature of the alloy, but slightly above the alpha/beta forge temperature, followed by quenching (e.g., fast quenching as described above). After typical aging/stress relief operations following solution heat treatment quenching and any additional stress relief operations associated with component manufacture (e.g. inertia, translation friction or other solid state or fusion welding), a low temperature age treatment to precipitate the titanium-copper particles can then be performed.

For alloys Cu-containing alloys with Si, billet and component processing and heat treatment approach would follow earlier discussions of Si-containing alloys, depending upon the level of Si additions, with the exception that a final precipitation age heat treatment would be necessary to bring out Cu-containing precipitates. This low temperature heat treatment to precipitate the titanium-copper particles might be combined with, or performed after any additional stress relief operations associated with component manufacture (e.g. inertia, translation friction or other solid state or fusion welding). As noted earlier, it is possible that with Si additions, ordering of the primary alpha matrix may occur, depending on the levels of primary alpha volume fraction, Si and other elements such as Al, O, C and/or N added to the alloy. If this ordering occurs, aging and/or stress relief heat treatment temperatures and/or times may need to be adjusted.

III. Other Alloy Constituents

Sn can optionally be included in the alloy composition, as stated above, and can potentially serve to stabilize the titanium silicide (e.g., $Ti_5Si_3$) phase in Si-containing alloys to higher temperatures. Thus, Sn may act to keep the silicide solvus temperature sufficiently higher than the beta transus temperature to allow for a wider process field for billet conversion during processing, particularly during the beta processing at a beta processing temperature that is above the beta transus temperature of the alloy but below the silicide solvus temperature of the titanium silicide solvus.

Similarly, Zr may be optionally included within the alloy composition to potentially serve as a stabilizing component for the titanium silicide phase (e.g., $Ti_5Si_3$) in Si-containing alloys, particularly at elevated temperatures.

As stated, carbon can optionally be present in the alloy composition in an amount of about 0.01 wt % to about 0.2 wt % (about 0.01 wt % to about 0.1 wt %). In one embodiment, the amount of carbon can be increased from a nominal level typically found in Ti-64 to about 1000 wppm or greater (but below the titanium carbon containing compound solvus, e.g., $Ti_2C$) in order to increase strength and HCF properties. Alternatively, the amount of C in the alloy can be increased above the titanium carbon containing compound solvus where the titanium carbon containing compound solvus temperature is above the beta transus temperature. In this case, the titanium carbon containing compound particles can be used and processed similar to that described above with respect to Si. That is, the titanium carbon containing compound particles can be used to control the beta crystallization during billet conversion in order to obtain as fine a prior beta grain size as possible. This use of C in the alloy can be used in conjunction with Si (to control the prior beta grain size) and/or Cu (for precipitate strengthening). It is known that additions of C to Ti alloys tend to increase the beta transus and result in a relatively shallow beta approach curve. This allows a relatively low volume fraction of primary alpha to be present at temperatures relatively far below the beta transus, increasing the range of microstructures that can be achieved on a practical scale. The C addition, when below the solid solubility limit in the alpha phase may result in increased properties such as strength and HCF due to a combination of C in solid solution in the primary and secondary alpha phases and refined primary alpha grain size. As in the case of Si additions, too high a level of C may also result in reduced ductility and/or toughness possibly due to a greater tendency to form ordered $Ti_3Al$ particles in the primary alpha phase. If ordered $Ti_3Al$ particles have a tendency to form during the aging and/or stress relief heat treatment, the temperature can be increased to above the $Ti_3Al$ solvus. In this case, it may be necessary to control the cooling rate after heat treatment to minimize the formation of $Ti_3Al$ particles. If a subsequent aging and/or stress relief temperature is required, then the degree of formation of $Ti_3Al$ particles and impact to properties such as ductility and toughness needs to be considered when selecting the subsequent heat treatment.

As stated, oxygen can optionally be present in the alloy composition up to about 0.3 wt %, or alternatively about 0.1 wt % to about 0.2 wt. As in the case of Si additions, too high a level of O may also result in reduced ductility and/or toughness due to a greater tendency to form ordered $Ti_3Al$ particles in the primary alpha phase. If ordered $Ti_3Al$ particles have a tendency to form during the aging and/or stress relief heat treatment, the temperature can be increased to above the $Ti_3Al$ solvus. In this case, it may be necessary to control the cooling rate after heat treatment to minimize the formation of $Ti_3Al$ particles. If a subsequent aging and/or stress relief temperature is required, then the degree of formation of Ti₃Al particles and impact to properties such as ductility and toughness needs to be considered when selecting the subsequent heat treatment.

As stated, Fe and Mo can optionally be present in the alloy singly, or in combination in an amount of [for Fe about 0.1 wt % to about 2 wt % iron (e.g., about 0.1 wt % to about 1 wt %, such as about 0.1 wt % to about 0.6 wt %), and for Mo up to about 2 wt % (e.g., about 0.5 wt % to about 1.5 wt %, such as about 0.5 wt % to about 1 wt %)]. Fe and Mo are both beta stabilizers and will tend to reduce the beta transus of the alloy.

Figure 5:
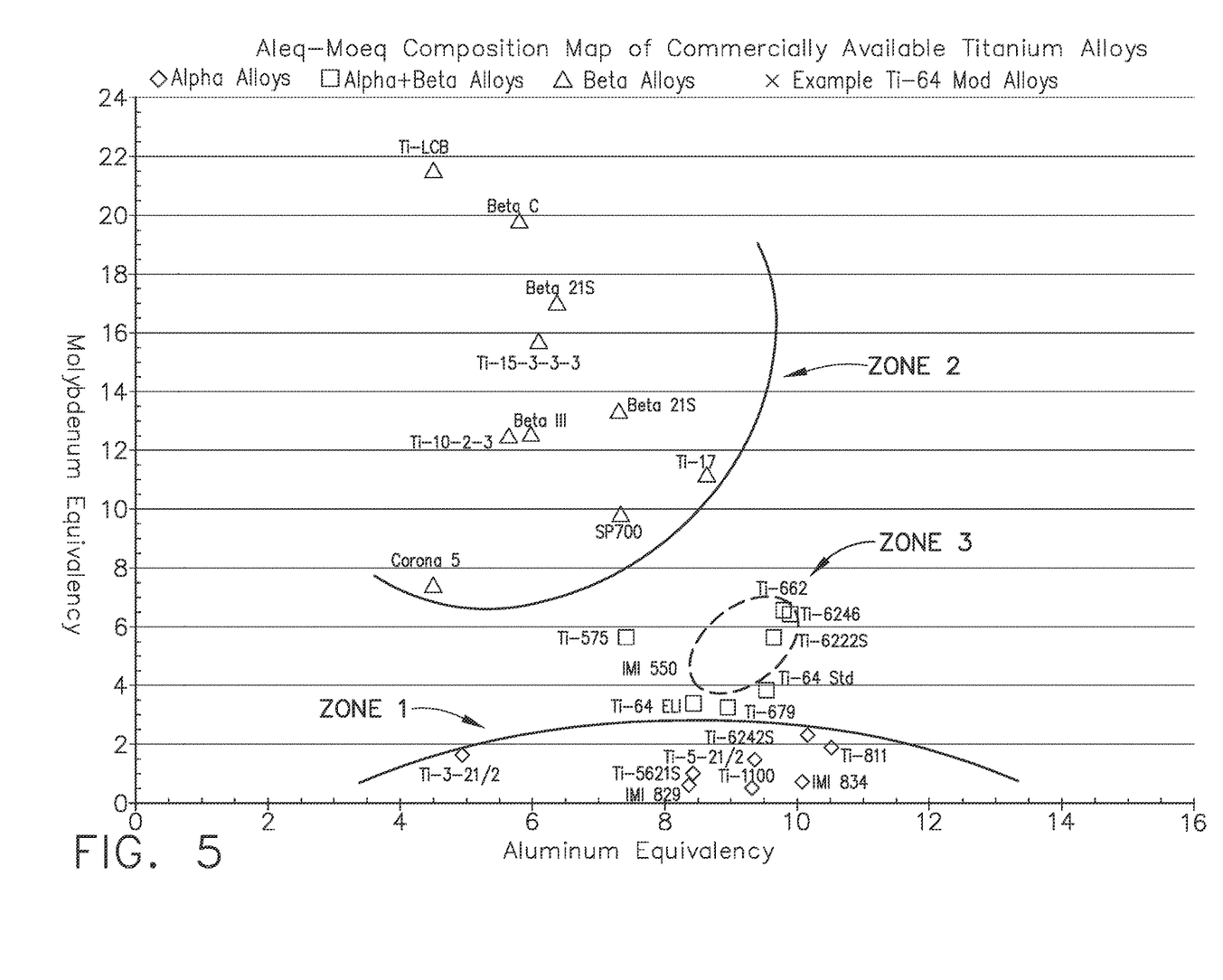
FIG. 5 shows a plot of a wide range of commercial alloys based on their calculated aluminum equivalence and molybdenum equivalence.

Alpha stabilizers (expressed as 'Aluminum Equivalence', defined by $Al_{eq}=Al+\frac{1}{3}*Sn+\frac{1}{6}*Zr+10*O+20*N+20/3*C$, where each element is expressed in weight percent) and beta stabilizers (expressed in terms of 'Molybdenum Equivalence' defined by $Mo_{eq}=Mo+\frac{2}{3}*V+2.9*Fe+1.6*Cr+0.28*Nb+10/13*Cu$, where each element is expressed in weight percent) can be included in the titanium alloy. While no coefficient exists for Si in either Aluminum Equivalence or Molybdenum Equivalence, it is likely that Si should be incorporated into the Aluminum Equivalence based on the increased tendency to form ordered Ti₃Al particles in the primary alpha matrix. FIG. 5 shows a wide range of commercial titanium alloys plotted based on aluminum equivalence and molybdenum equivalence definitions noted above. Zone 1 contains near alpha commercial alloys that have low beta stabilizer content and are not typically very hardenable in thick section size. These alloys may be used as hub materials for blisks, however, their application may be limited as a result of limited hardenability and relatively poor fatigue properties in thick section size. Zone 1 alloys may form a predominantly hexagonal martensite structure following quenching as a result of solid state welding. The solid state welds can typically be toughened by aging at a temperature that will not degrade the base alloy properties away from the weld and heat affected zone. Note, the solid state weld could be toughened by a local heat treatment affecting only material in the vicinity of the weld, however, there are control issues surrounding this approach, including residual stress control. Therefore, it may be more desirable to heat treat the entire welded component.

Zone 2 contains beta or near-beta commercial alloys that have high beta stabilizer content and are typically hardenable in thick section size following quenching and aging. Alloys such as Ti-17 in zone 2 may be used as hub materials for blisks as a result of their excellent hardenability. Zone 2 alloys may form retained beta following quenching as a result of solid state welding. The retained beta welds may be lower strength than the base alloy away from the weld, and require post weld aging to increase the strength of the weld. Aging at lower temperatures may result in excessive hardening in the weld as a result of ultra-fine alpha or omega phase precipitation. Aging at higher temperatures may result in a tough weld, however, depending on the base alloy composition, the higher aging temperature used to toughen the weld may result in a reduction in strength and fatigue in the base alloy material away from the weld.

Figure 6:
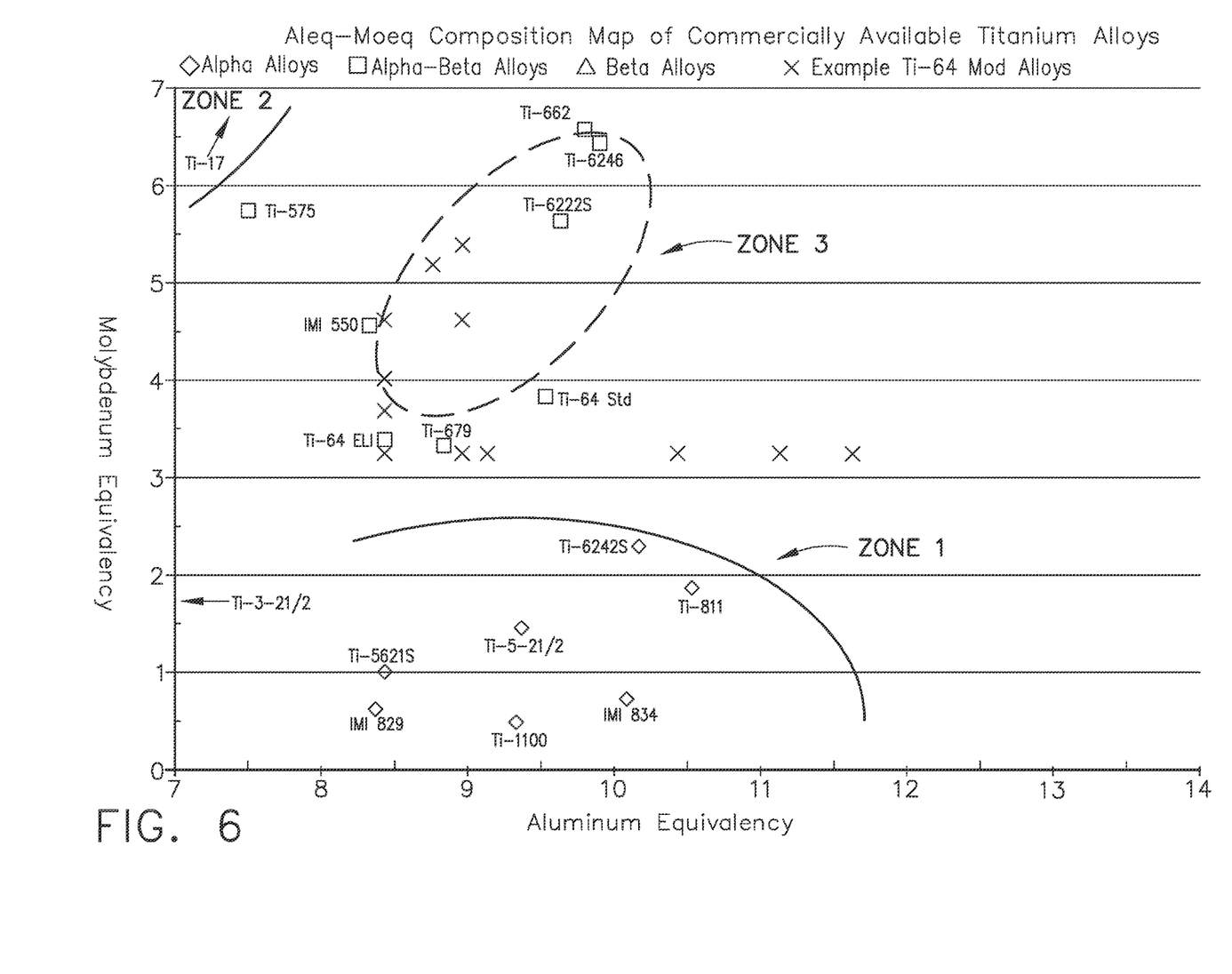
FIG. 6, expanded from FIG. 5, shows a portion of aluminum equivalence and molybdenum equivalence of selected commercial alloys and includes example alloys of the present invention.

Zone 3 contains alpha plus beta alloys having intermediate levels of beta stabilizer content and are hardenable up to intermediate section sizes following quenching and aging. Note, Zone 3 in FIGS. 5 and 6 is shown as a dotted line, and may extend up to the boundaries shown delineating Zones 1 and 2. Alloys such as Ti-6246 in zone 3 may be used as a hub material for blisks as a result of their hardenability. Zone 3 alloys may form a combination of orthorhombic martensite, hexagonal martensite and/or retained beta following quenching as a result of solid state welding. The welds may have higher strength than the base alloy away from the weld, and require post weld heat treatment to reduce the strength of the weld. Aging at high temperature may be required in order to reduce the strength and toughen the weld, however, depending on the base alloy composition, the high aging temperature used to toughen the weld may result in a reduction in strength and fatigue in the base alloy material away from the weld. As noted above, the solid state weld could be toughened by a local heat treatment affecting only material in the vicinity of the weld, however, there are control issues surrounding this approach, including residual stress control. Therefore, it may be more desirable to heat treat the entire welded component.

FIG. 6 shows the lower portion of FIG. 5, centered on zones 1 and 3 and also shows the experimental alloys from Table 2 below. The experimental alloys may have increased hardenability over Ti-64 as a result of increased beta stabilizer content, but to also have a high age temperature, allowing heat treatment of a solid state welded component to toughen the solid state weld without reducing the base alloy properties away from the weld.

In the case that the experimental alloy has insufficient strength and fatigue properties for thick section applications such as large section size blisks, additional processing steps can be added to refine the primary alpha grain size, regardless of whether the alloy contains silicon, copper, or both silicon and copper. Table 2 summarizes room temperature, HCF smooth bar, A ratio=1, run out stresses at 10 million cycles for thick section Ti-64 forgings processed to two different primary alpha grain sizes of approximately 15 microns and approximately 2 microns as measured by a linear intercept method. Forging methods to reduce primary alpha grain size include, but are not limited to, processing at a lower final alpha/beta forge temperature, or forging in multiple directions, see, for example, US2014/0261922, EP1546429B1, and US2012/0060981. Table 2 shows that the reduction in primary alpha grain size of approximately seven-fold results in an approximate 30% increase in HCF strength. Therefore, additional processing to refine primary alpha grain size may result in a component with an enhanced balance of properties.

TABLE 2

10^7 Runout High Cycle Fatigue Stresses for Ti-64 Thick Section Pancakes Processed to Two Primary Alpha Grain Sizes

| | |
|---|---|
| Approximately 15 microns | 32.5 ksi |
| Approximately 2 microns | 42.5 ksi |

IV. Alloy Components

FIG. 1 is a schematic illustration of an exemplary turbofan engine assembly 10 having a central rotational axis 12. In the exemplary embodiment, turbofan engine assembly 10 includes an air intake side 14 and an exhaust side 16. Turbofan engine assembly 10 also includes a core gas turbine engine 18 that includes a high-pressure compressor 20, a combustor 22, and a high-pressure turbine 24. Moreover, turbofan engine assembly 10 includes a low-pressure turbine 26 that is disposed axially downstream from core gas turbine engine 18, and a fan assembly 28 that is disposed axially upstream from core gas turbine engine 22. Fan assembly 28 includes an array of fan blades 30 extending radially outward from a rotor hub 32. Furthermore, turbofan engine assembly 10 includes a first rotor shaft 34 disposed between fan assembly 28 and the low-pressure turbine 26, and a second rotor shaft 36 disposed between high-pressure compressor 20 and high-pressure turbine 24 such that fan assembly 28, high-pressure compressor 20, high-pressure turbine 24, and low-pressure turbine 26 are in serial flow communication and co-axially aligned with respect to central rotational axis 12 of turbofan engine assembly 10.

During operation, air enters through intake side 14 and flows through fan assembly 28 to high-pressure compressor 20. Compressed air is delivered to combustor 22. Airflow from combustor 22 drives high-pressure turbine 24 and low-pressure turbine 26 prior to exiting turbofan engine assembly 10 through exhaust side 16.

High-pressure compressor 20, combustor 22, high-pressure turbine 24, and low-pressure turbine 26 each include at least one rotor assembly. Rotary or rotor assemblies are generally subjected to different temperatures depending on their relative axial position within turbofan engine assembly 10. For example, in the exemplary embodiment, turbofan engine assembly 10 has generally cooler operating temperatures towards forward fan assembly 28 and hotter operating temperatures towards aft high-pressure compressor 20. As such, rotor components within high-pressure compressor 20 are generally fabricated from materials that are capable of withstanding higher temperatures as compared to fabrication materials for rotor components of fan assembly 28.

While turbofan engine assembly 10, represents one member of the class of rotary machines, other members include land based gas turbines, turbojets, turboshaft engines, unducted engines, unducted fans, fixed-wing and propeller rotors, and the like, as well as distributed propulsors such as distributed fans or pods, and the like. It will be appreciated by a person skilled in the art that practicing the invention would including making and using components in forms of a rotary machine parts useful in operating such rotary machines. Exemplary rotary machine parts include, for example, a disk, blisk, airfoil, blade, vane, integral bladed rotor, frame, fairing, seal, gearbox, case, mount, shaft, and the like.

Similarly, it will be appreciated by a person skilled in the art that practicing the invention would including making and using components in form of an airframe part including, for example, a spar, rib, frame, box, pylon, fuselage, stabilizer, undercarriage, wing, seat track, and fairing, and the like.

Also, a component having an article, such as the airfoil 60 of FIG. 2, may be made from the inventive alloy. Example articles may have a thick section, be cast and wrought, or be a structural aerospace casting, or the like.

EXAMPLES

Table 3 compares exemplary titanium alloys, both comparison alloys and inventive alloys, with Ti-64:

TABLE 3

(wt %) Chemical Compositions of Selected Experimental Alloys

Measured Composition—All elements in wt %

| | Ti | Al | V | Fe | O | N | C | Mo | Si | Cu | W |
|---|---|---|---|---|---|---|---|---|---|---|---|
| A Avg. | 88.918 | 6.715 | 3.980 | 0.178 | 0.159 | 0.009 | 0.014 | 0.003 | 0.021 | 0.004 | 0.000 |
| B Avg. | 88.453 | 6.943 | 4.130 | 0.210 | 0.206 | 0.008 | 0.026 | 0.002 | 0.020 | 0.002 | 0.000 |
| C Avg. | 87.975 | 7.293 | 3.918 | 0.173 | 0.201 | 0.387 | 0.018 | 0.002 | 0.031 | 0.003 | 0.000 |
| D Avg. | 87.555 | 7.573 | 3.993 | 0.195 | 0.227 | 0.415 | 0.019 | 0.002 | 0.019 | 0.003 | 0.000 |
| E Avg. | 88.922 | 6.638 | 4.028 | 0.180 | 0.159 | 0.008 | 0.044 | 0.002 | 0.019 | 0.003 | 0.000 |
| F Avg. | 88.812 | 6.693 | 4.003 | 0.183 | 0.179 | 0.008 | 0.102 | 0.003 | 0.016 | 0.003 | 0.000 |
| G Avg. | 87.941 | 6.693 | 3.910 | 0.360 | 0.180 | 0.009 | 0.039 | 0.358 | 0.508 | 0.004 | 0.000 |
| H Avg. | 87.190 | 6.423 | 3.765 | 0.443 | 0.184 | 0.019 | 0.082 | 0.465 | 0.673 | 0.758 | 0.000 |
| I Avg. | 88.181 | 6.603 | 3.913 | 0.520 | 0.157 | 0.009 | 0.025 | 0.560 | 0.028 | 0.005 | 0.000 |
| J Avg. | 87.541 | 6.610 | 3.850 | 0.455 | 0.173 | 0.010 | 0.074 | 0.495 | 0.022 | 0.770 | 0.000 |
| K Avg. | 88.406 | 6.683 | 3.923 | 0.175 | 0.153 | 0.009 | 0.014 | 0.003 | 0.635 | 0.002 | 0.000 |
| L Avg. | 88.773 | 6.605 | 3.930 | 0.173 | 0.159 | 0.009 | 0.019 | 0.002 | 0.023 | 0.308 | 0.000 |
| M Avg. | 88.562 | 6.708 | 3.890 | 0.188 | 0.143 | 0.009 | 0.019 | 0.003 | 0.020 | 0.004 | 0.455 |

TABLE 4

Room Temperature Tensile Properties of Selected Alloys from Table 3

| Approx. Cooling Rate→ | UTS (ksi) 75F | | | 0.2% Yield (ksi) 75F | | | % El 75F | | |
|---|---|---|---|---|---|---|---|---|---|
| Composition↓ | 600F/ min | 200F/ min | 130F/ min | 600F/ min | 200F/ min | 130F/ min | 600F/ min | 200F/ min | 130F/ min |
| A | 144.6 | 141 | 140.3 | 128.6 | 124.9 | 124.2 | 19.5 | 17 | 19 |
| B | 153.3 | 146.8 | | 138.9 | 130.5 | | | 17 | 17 |
| F | 157.8 | 155.8 | | 140.1 | 136.3 | | | 17 | 17 |
| G | 167.1 | 164 | 164.6 | 155.1 | 151.1 | 152.2 | 16.5 | 17 | 17 |
| H | 183.1 | 185.9 | | 176.1 | 174.4 | | 3.9 | 9.5 | |
| I | 161.7 | | | 137.4 | | | 19 | | |
| J | 170.6 | 166.1 | 164.2 | 159.7 | 155.2 | 152.1 | 11.7 | 17 | 18 |
| K | 166 | 160.2 | 159.7 | 152 | 145.9 | 145.6 | 15 | 17 | 16 |
| L | 149.5 | 145.8 | | 138.9 | 132.5 | | | 18 | 19 |
| M | 149 | 145.4 | | 134.4 | 128.4 | | | 17 | 19 |

TABLE 5

300F Tensile Properties of Selected Alloys from Table 3

| Approx. Cooling Rate→ | UTS (ksi) 300F | | | 0.2% Yield (ksi) 300F | | | % El 300F | | |
|---|---|---|---|---|---|---|---|---|---|
| Composition↓ | 600F/min | 200F/min | 130F/min | 600F/min | 200F/min | 130F/min | 600F/min | 200F/min | 130F/min |
| A | 122.8 | | 122.6 | 101.7 | | 102.1 | 19.7 | | 20.5 |
| B | 132.8 | | | 110.4 | | | 18 | | |
| F | 133.4 | | | 110.7 | | | 18.5 | | |
| G | 145.5 | | 145.2 | 126.6 | | 127.3 | 19 | | 18 |
| H | 166.5 | | | 149.4 | | | 13.2 | | |
| I | 132.8 | | | 111.4 | | | 22 | | |
| J | 150.0 | | 146.0 | 131.8 | | 128.2 | 18 | | 18 |
| K | 150.3 | | 140.8 | 125.1 | | 121.6 | 17 | | 17 |
| L | 128.3 | | | 108.5 | | | 19.7 | | |
| M | 130.7 | | | 109.0 | | | 18 | | |

TABLE 6

600F Tensile Properties of Selected Experimental Alloys from Table 3

| Approx. Cooling Rate→ | UTS (ksi) 600F | | | 0.2% Yield (ksi) 600F | | | % El 600F | | |
|---|---|---|---|---|---|---|---|---|---|
| Composition↓ | 600F/min | 200F/min | 130F/min | 600F/min | 200F/min | 130F/min | 600F/min | 200F/min | 130F/min |
| A | 105.6 | 101 | 102.5 | 83.4 | 78.8 | 79.2 | 19 | 19 | 20 |
| B | 108.2 | 105.5 | | 85.1 | 82.1 | | 19.7 | 19 | |
| F | 112.9 | 111 | | 88.5 | 87 | | 18 | 17 | |
| G | 127.4 | 123.4 | 125.9 | 104.9 | 100.8 | 103.2 | 17 | 17 | 18 |
| H | 148.9 | 149.1 | | 128.8 | 127.4 | | 15.5 | 17 | |
| I | 115.1 | | | 90.7 | | | 16.5 | | |
| J | 133.0 | 127.3 | 127.2 | 111.2 | 105.9 | 104.2 | 19 | 17 | 17 |
| K | 126.5 | 122.5 | 122.1 | 103.5 | 99.6 | 99.8 | 16.2 | 17 | 16 |
| L | 108.5 | 108.4 | | 85.7 | 83.8 | | 19.7 | 22 | |
| M | 108.2 | 107.6 | | 85.0 | 83.8 | | 18 | 20.5 | |

Tables 4, 5, and 6, show room temperature, 300° F., and 600° F. tensile properties as a function of cooling rate from solution heat treatment for some of the alloys listed in Table 3. Compared with the Ti-64 baseline, Alloy A, it is seen that at a slow cooling rate of approximately 130° F. per minute, Alloys G (Ti-64 plus Fe, Mo and Si) and J (Ti-64 plus Fe, Mo, Si and Cu) tested at room temperature have slightly lower plastic elongations, but ultimate and 0.2% yield strengths on the order of 25-30 ksi higher.

Table 7 shows the effect of alloying on tensile modulus properties for in increased room temperature through 600 F modulus. When C, Fe and Mo are added in conjunction with Si, there is a smaller increase in tensile modulus at room temperature and 600 F. Similarly for C, Fe, Mo and Cu are added to the Ti-64 base, there is a small increase in room temperature and 600 F tensile modulus. Increased modulus results in a potential reduction in airfoil stresses in the case of blisk applications, potentially enabling thinner airfoils to be designed having lower weight and improved performance.

TABLE 7

Elastic Modulus (Msi) of Selected Experimental Alloys from Table 3

| | Temperature (° F.) | | |
|---|---|---|---|
| Alloy | 75 | 300 | 600 |
| A | 16.4 | 16 | 13 |
| G | 16.7 | 15.7 | 13.7 |
| J | 16.9 | 15.6 | 14.1 |
| K | 17.1 | 16.6 | 14.2 |

Table 8 shows 10 million cycle, room temperature HCF runout stresses for notched bars with a stress concentration (Kt) of approximately 2, A ratio=infinity and 0.5. At A=infinity, an approximate 45% improvement is seen in the 10 million cycle HCF runout stress, while at A=0.5, the 10 million cycle HCF runout stress improvement is approximately 10%.

TABLE 8

10^7 Runout High Cycle Fatigue Stresses for Selected Experimental Alloys from Table 3

| Alloy | A Ratio | Runout Stress (ksi) |
|---|---|---|
| Alloy A | A = Infinity | 62.0 ksi |
| Alloy A | A = 0.5 | 33.5 ksi |
| Alloy G | A = Infinity | 88.0 ksi |
| Alloy G | A = 0.5 | 36.5 ksi |
| Alloy J | A = Infinity | 91.0 ksi |
| Alloy J | A = 0.5 | 37.0 ksi |
| Alloy K | A = Infinity | 91.0 ksi |
| Alloy K | A = 0.5 | 35.0 ksi |

The resistance to foreign object damage (FOD) was assessed using a compressed gas ballistic rig, firing approximately 0.175" steel ball bearings at Alloy A, G, J and K coupons at speeds ranging from approximately 600 to approximately 1000 feet per second.

Baseline Ti-64 (Alloy A) showed no plugging at approximately 800 ft/s and below. At approximately 1000 ft/s, plugging occurred, but no radial cracks were observed. Alloys G, J and K showed equivalent or better results at all speeds tested, with similar or less deformation around the impact area. In the case Alloy J, the ball did not plug at approximately 1000 ft/s, implying a superior combination of strength and ductility at the high impact strain rates involved.

While the invention has been described in terms of one or more particular embodiments, it is apparent that other forms could be adopted by one skilled in the art. It is to be understood that the use of "comprising" in conjunction with the compositions described herein specifically discloses and includes the embodiments wherein the compositions "consist essentially of" the named components (i.e., contain the named components and no other components that significantly adversely affect the basic and novel features disclosed), and embodiments wherein the compositions "consist of" the named components (i.e., contain only the named components except for contaminants which are naturally and inevitably present in each of the named components).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming an alloy component having a beta transus temperature and a titanium silicide solvus temperature, the method comprising:

hot working a titanium alloy ingot at a temperature that is above the beta transus temperature, wherein the titanium alloy ingot comprises 6 wt % to 7 wt % aluminum; 2.5 wt % to 5.5 wt % vanadium; 0.1 wt % to 1 wt % iron; 0.1 wt % to 2 wt % molybdenum; 0.01 wt % to 0.2 wt % carbon; up to 0.3 wt % oxygen; 0.1 wt % to 2 wt % silicon; up to 2 wt % of zirconium; up to 2 wt % of tin; and a balance of titanium;

hot working the titanium alloy ingot at a temperature that is below both the beta transus temperature of the alloy and the titanium silicide solvus temperature of the alloy;

hot working the titanium alloy ingot at a temperature that is above the beta transus temperature of the alloy but below the titanium silicide solvus temperature of the alloy;

hot working the titanium alloy ingot at a temperature that is below both the beta transus temperature of the alloy and the titanium silicide solvus temperature, thereby forming a billet;

hot working the billet at a temperature below both the beta transus temperature of the alloy and the titanium silicide solvus temperature of the alloy to form a forging; and solution heat treating the forging at a temperature below the beta transus temperature of the alloy and the titanium silicide solvus temperature of the alloy.

2. The method of claim 1, further comprising:

homogenization of the forging after solution heat treating.

3. The method of claim 1, wherein the titanium alloy has silicon present in an amount of 0.1 wt % to 1 wt %.

4. The method of claim 1, wherein the titanium alloy has molybdenum present in an amount of 0.5 wt % to 1.5 wt %.

5. The method of claim 1, wherein the titanium alloy ingot consists of 6 wt % to 7 wt % aluminum; 2.5 wt % to 5.5 wt % vanadium; 0.1 wt % to 1 wt % iron; 0.1 wt % to 2 wt % molybdenum; 0.01 wt % to 0.2 wt % carbon; up to 0.3 wt % oxygen; 0.1 wt % to 2 wt % silicon; up to 2 wt % of zirconium; up to 2 wt % of tin; and a balance of titanium.

* * * * *